United States Patent
Utsuno et al.

(10) Patent No.: US 10,818,966 B2
(45) Date of Patent: Oct. 27, 2020

(54) SULFIDE SOLID ELECTROLYTE WITH ARGYRODITE TYPE CRYSTAL STRUCTURE

(71) Applicant: IDEMITSU KOSAN CO., LTD., Chiyoda-ku (JP)

(72) Inventors: Futoshi Utsuno, Sodegaura (JP); Kota Terai, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 24 days.

(21) Appl. No.: 15/672,462

(22) Filed: Aug. 9, 2017

(65) Prior Publication Data

US 2018/0069262 A1 Mar. 8, 2018

(30) Foreign Application Priority Data

Sep. 8, 2016 (JP) .................................. 2016-175359

(51) Int. Cl.
*H01M 10/0562* (2010.01)
*H01M 4/62* (2006.01)
(Continued)

(52) U.S. Cl.
CPC ......... *H01M 10/0562* (2013.01); *H01M 4/36* (2013.01); *H01M 4/62* (2013.01);
(Continued)

(58) Field of Classification Search
CPC ...... H01M 10/0562; H01M 4/62; H01M 4/36; H01M 10/0525; H01M 2300/0068; H01M 2300/0065

See application file for complete search history.

(56) References Cited

U.S. PATENT DOCUMENTS 5,958,281 A    9/1999  Takada et al.
2010/0290969 A1  11/2010  Deiseroth et al.
(Continued)

FOREIGN PATENT DOCUMENTS

EP    3 171 444 A1    5/2017
JP    7-330312 A    12/1995
(Continued)

OTHER PUBLICATIONS

Rayavarapu et al. "Variation in structure and Li-ion migration in argyrodite-type Li6PS5X (X=Cl, Br, I) solid electrolyte", Oct. 28, 2011, J Solid State Electrochem 16:1807-1813 (Year: 2011).*

(Continued)

*Primary Examiner* — Robert S Carrico
*Assistant Examiner* — Kwang Han
(74) *Attorney, Agent, or Firm* — Oblon, McClelland, Maier & Neustadt, L.L.P.

(57) ABSTRACT

Aimed at providing a sulfide solid electrolyte comprising an argyrodite type crystal structure, having a high ionic conductivity due to presence of a large amount of a halogen element and is capable of suppressing agglomeration at the time of production. Provided is a sulfide solid electrolyte comprising lithium, phosphorus, sulfur and one or more elements X selected from halogen elements, wherein the sulfide solid electrolyte comprises an argyrodite type crystal structure, and wherein a molar ratio of the lithium to the phosphorus "a (Li/P)", a molar ratio of the sulfur to the phosphorus "b (S/P)" and a molar ratio of the element X to the phosphorus "c (X/P)" satisfy the following formulas (1) to (3):

$$5.0 \leq a < 7.3 \tag{1}$$

$$0.70 \leq a - b < 1.0 \tag{2}$$

$$7.0 < a + c \leq 7.3 \tag{3}$$

provided that b>0 and c>0.

20 Claims, 2 Drawing Sheets

(51) Int. Cl.
*H01M 4/36* (2006.01)
*H01M 10/0525* (2010.01)

(52) U.S. Cl.
CPC ............ *H01M 10/0525* (2013.01); *H01M 2300/0065* (2013.01); *H01M 2300/0068* (2013.01)

(56) References Cited

U.S. PATENT DOCUMENTS

| | | |
|---|---|---|
| 2011/0081580 A1 | 4/2011 | Stadler et al. |
| 2016/0156064 A1 | 6/2016 | Miyashita et al. |

FOREIGN PATENT DOCUMENTS

| | | |
|---|---|---|
| JP | 9-283156 A | 10/1997 |
| JP | 2010-163356 A | 7/2010 |
| JP | 2010-540396 A | 12/2010 |
| JP | 2011-84438 A | 4/2011 |
| JP | 2011-96630 A | 5/2011 |
| JP | 2013-211171 A | 10/2013 |
| JP | 2016-24874 A | 2/2016 |
| WO | WO 2015/011937 A1 | 1/2015 |
| WO | WO 2015/012042 A1 | 1/2015 |
| WO | WO 2016/104702 A1 | 6/2016 |
| WO | WO-2017108105 A1 * | 6/2017 ............... H01B 1/10 |

OTHER PUBLICATIONS

R.P. Rao, et al "Studies of lithium argyrodite solid electrolytes for all-solid-state batteries", Physica Status Solidi A, vol. 208, No. 8, 2011, pp. 1804-1807 and cover page.

Sylvain Boulineau, et al., "Mechanochemical synthesis of Li-argyrodite $Li_6PS_5X$ (X = Cl. Br, I) as sulfur-based solid electrolytes for all solid state batteries application", Solid State Ionics, vol. 221, 2012, pp. 1-5.

Hans-Jörg Deiseroth, et al., "$Li_6PS_5X$: A Class of Crystalline Li-Rich Solids With an Unusually High Li+ Mobility**", Angewandte Chemie, vol. 47, No. 4, 2008, pp. 755-758 and cover page.

* cited by examiner

SULFIDE SOLID ELECTROLYTE WITH ARGYRODITE TYPE CRYSTAL STRUCTURE

TECHNICAL FIELD

The invention relates to a sulfide solid electrolyte, an electrode mix and a lithium ion battery.

BACKGROUND ART

In recent years, with rapid spread of information-related equipment or communication equipment such as PCs, video cameras, mobile phones, etc., development of a battery used as the power source thereof have considered to be important. Among the batteries, a lithium ion battery has attracted attention due to its high energy density.

In a lithium ion battery that is currently commercially available, since an electrolyte containing a flammable organic solvent is used, attachment of a safety device that suppresses an increase in temperature at the time of short circuit or improvement in structure and material in order to avoid occurrence of short circuit is required. On the other hand, since a lithium ion battery obtained by allowing a battery to be totally solid by using a solid electrolyte as an electrolyte does not use a flammable organic solvent in a battery, simplification of a safety device can be attained, by which saving a production cost or improving productivity.

As the solid electrolyte used in a lithium ion battery, a sulfide solid electrolyte is known. As the crystal structure of a sulfide solid electrolyte, various structures are known. As one of such crystal structures, an argyrodite type crystal structure is known (Patent Documents 1 to 5, Non-Patent Documents 1 to 3).

An argyrodite type crystal structure is a highly stable crystal structure, and some of them have high lithium ion conductivity.

RELATED ART DOCUMENT

Patent Documents

Patent Document 1: JP-T-2010-540396
Patent Document 2: WO2015/011937
Patent Document 3: WO20151012042
Patent Document 4: JP-A-2016-24874
Patent Document 5: WO2016/104702

Non-Patent Documents

Non-Patent Document 1: Angew. chem Vol. 47 (2008), No. 4, P. 755-758
Non-Patent Document 2: Phys. Status. Solidi Vol. 208 (2011), No. 8, P. 1804-1807
Non-Patent Document 3: Solid State Ionics Vol. 221 (2012) P. 1-5

SUMMARY OF THE INVENTION

Problems to be Solved by the Invention

One object of the invention is to provide a novel sulfide solid electrolyte comprising an argyrodite type crystal structure and having a high ionic conductivity due to presence of a large amount of a halogen element.

One object of the invention is to provide a sulfide solid electrolyte comprising an argyrodite type crystal structure that can suppress agglomeration at the time of production.

Means for Solving the Problems

According to one embodiment of the invention, provided is a sulfide solid electrolyte comprising lithium, phosphorus, sulfur and one or more elements X selected from halogen elements, wherein the sulfide solid electrolyte comprises an argyrodite type crystal structure, and wherein a molar ratio of the lithium to the phosphorus "a (Li/P)", a molar ratio of the sulfur to the phosphorus "b (S/P)" and a molar ratio of the element X to the phosphorus "c (X/P)" satisfy the following formulas (1) to (3):

$$5.05 \leq a < 7.3 \tag{1}$$

$$0.705 \leq a-b < 1.0 \tag{2}$$

$$7.0 < a+c \leq 7.3 \tag{3}$$

provided that b>0 and c>0.

Advantageous Effects of the Invention

According to one embodiment of the invention, it is possible to provide a sulfide solid electrolyte comprising an argyrodite type crystal structure and having a high ionic conductivity due to presence of a large amount of a halogen element.

Further, according to one embodiment of the invention, it is possible to provide a sulfide solid electrolyte comprising an argyrodite type crystal structure that can suppress agglomeration at the time of production.

MODE FOR CARRYING OUT THE INVENTION

Figure 1:
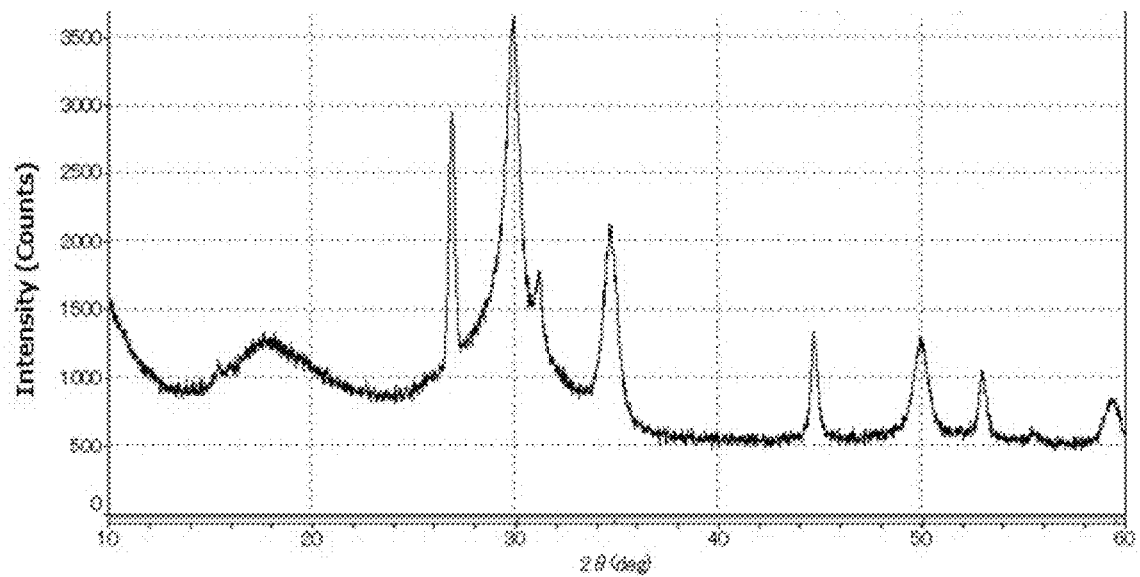
FIG. 1 is an X-ray diffraction pattern of an intermediate obtained in Example 1.

The sulfide solid electrolyte according to one embodiment of the invention comprises lithium, phosphorus, sulfur and one or more elements X selected from halogen elements, and characterized in that a molar ratio of the lithium to the phosphorus "a (Li/P)", a molar ratio of the sulfur to the phosphorus "b (S/P)" and a molar ratio of the element X to the phosphorus "c (X/P)" satisfy the following formulas (1) to (3):

$$5.05 \leq a < 7.3 \tag{1}$$

$$0.705 \leq a-b < 1.0 \tag{2}$$

$$7.0 < a+c \leq 7.3 \tag{3}$$

provided that b>0 and c>0.

The stoichiometric composition of a sulfide solid electrolyte comprising a common argyrodite type crystal structure is represented by $Li_{7-x}PS_{6-x}X_x$. The sulfide solid electrolyte of this embodiment has a composition different from a normal composition. When deviation in composition of S is taken as α and deviation in composition of X is taken as β, the composition of the sulfide solid electrolyte of this embodiment is represented by $Li_{7-x}PS_{6-x+\alpha}X_{x+\beta}$. In this case, a−b in the above formula (2) is a−b=7−x−(6−x+α)=1−α. a−b is a value correlated with the deviation in composition of S. a+c in the formula (3) is a+c=7−x+x+β=7+β. a+c is a value correlated with the deviation in composition of X.

0.70≤a−b<1.0 in the formula (2) becomes 0.70≤1−α<1.0. When the formula is further modified, it becomes 0<α≤0.30. That is, the sulfide solid electrolyte of this embodiment is a sulfide solid electrolyte that contains an excessive amount of S (sulfur) as compared with a sulfide solid electrolyte that comprises a common argyrodite type crystal structure.

The 7.0<a+c≤7.3 in the formula (3) becomes 7.0<7+β≤7.3. When the formula is further modified, it becomes 0≤β<0.3. That is, the sulfide solid electrolyte of this embodiment is a sulfide solid electrolyte that contains an excessive amount of X (halogen) as compared with a sulfide solid electrolyte that comprises a common argyrodite type crystal structure.

As the halogen element, F, Cl, Br, I or the like can be given.

The above formula (2) is preferably 0.855a−b<1.0, with 0.95a−b<1.0 being more preferable.

The above formula (3) is preferably 7.0<a+c≤7.15, with 7.0<a+c≤7.1 being more preferable.

In the sulfide solid electrolyte of this embodiment, when the above formula (1) is satisfied, the above formula (2) is 0.70≤a−b<1.0 and the above formula (3) is 7.0<a+c≤7.3, the ionic conductivity is 5.0 mS/cm or more. When the above formula (1) is satisfied, the above formula (2) is 0.85≤a−b<1.0 and the above formula (3) is 7.0<a+c≤7.15, the ionic conductivity can be higher, i.e. 5.5 mS/cm or more. Further, when the above formula (1) is satisfied, the above formula (2) is 0.9≤a−b<1.0 and the above formula (3) is 7.0<a+c≤7.1, the ionic conductivity can be further higher, i.e. 6.5 mS/cm or more.

The molar ratio or composition of each element in the sulfide solid electrolyte can be measured by the inductively coupled plasma atomic emission spectroscopy. The method for measuring by the inductively coupled plasma atomic emission spectroscopy is described in the Examples.

The molar ratio of each element can be controlled by adjusting the content of each element in the raw materials.

As the ionic radius of the halogen element is smaller, the amount of the halogen elements contained in the argyrodite type crystal structure increases and the ionic conductivity becomes higher. Therefore, it is preferred that the molar ratio "a" of the lithium to the phosphorus can be adjusted by the ionic radius of the halogen element. The halogen element (X) can be classified into three types F, Cl($X_1$), Br($X_2$) and I($X_3$) depending on the ionic radius.

In the entire element X, when the molar ratio of element $X_1$ is largest, it is preferred that the above-mentioned formula (1) be 5.1≤a≤6.6, with 5.2≤a≤6.4 being more preferable. When the molar ratio of element $X_2$ is largest, it is preferred that the above-mentioned formula (1) be 5.2≤a≤6.8, with 5.3≤a≤6.6 being more preferable. Further, when the molar ratio of element $X_3$ is largest, it is preferred that the above-mentioned formula (1) be 5.3≤a≤7.0, with 5.4≤a≤6.8 being more preferable.

The sulfide solid electrolyte of this embodiment comprises an argyrodite type crystal structure. Presence of an argyrodite type crystal structure can be confirmed by presence of diffraction peaks at 2θ=25.2±0.5 deg and 29.7±0.5 deg by powder X-ray diffractometry using CuKα rays.

The diffraction peaks at 2θ=25.2±0.5 deg and 29.7±0.5 deg are peaks derived from an argyrodite type crystal structure. The argyrodite type crystal structure is a structure in which $PS_4^{3-}$ is present as the unit structure of the main framework structure and in which a sulfur element (S) or a halogen element (X) surrounded by a lithium element (Li) is located around $PS_4^{3-}$.

The diffraction peak of an argyrodite type crystal structure may often appear at 2θ=15.3±0.5 deg, 17.7±0.5 deg, 31.1±0.5 deg, 44.9±0.5 deg and 47.7±0.5 deg, for example. The sulfide solid electrolyte of this embodiment may have these peaks.

In this embodiment, the position of the diffraction peak is judged to be A±0.5 deg or A±0.4 deg assuming that the median value is A. The position is preferably A±0.3 deg. For example, in the case of the above-mentioned diffraction peak of 2θ=25.2±0.5 deg, the median value A is 25.2 deg and is preferably present in a range of 2θ=25.2±0.3 deg. The same can be applied to judgement of all of the other diffraction peak positions in this embodiment.

As the argyrodite type crystal structure, crystal structures disclosed in the Non-Patent Documents 1 to 3, JP-T-2010-540396, JP-A-2011-096630 and JP-A-2013-211171 can be given, for example.

The sulfide solid electrolyte of this embodiment may contain crystal structures other than the argyrodite type crystal structure. In general, in a sulfide solid electrolyte, various crystal components and amorphous components are present in mixture. A sulfide solid electrolyte comprising a crystal structure is a sulfide solid electrolyte for which a peak derived from a solid electrolyte is observed in an X-ray diffraction pattern in an X-ray diffractometry. Further, there may be a case that remaining raw materials are contained.

The sulfide solid electrolyte of this embodiment may contain elements such as Si, Ge, Sn, Pb, B, Al, Ga, As, Sb and Bi in addition to the lithium, the phosphorus, the sulfur and the element X. Further, it may contain chalcogen elements (oxygen (O), selenium (Se), tellurium (Te), etc.). When the sulfide solid electrolyte comprises one or more elements M selected from the group consisting of Si, Ge, Sn, Pb, B, Al, Ga, As, Sb and Bi, the molar ratio of each element in the above-mentioned (1) to (3) is a molar ratio relative to the total of the element M and phosphorus. For example, the molar ratio of the lithium to the phosphorus "a (Li/P)" is Li/(P+M).

It is preferred that the sulfide solid electrolyte of this embodiment satisfy, for example, the composition represented by the following formula (4):

$$Li_a(P_{1-z}M_z)S_bX_c \quad (4)$$

wherein in the above formula, M is one or more elements selected from the group consisting of Si, Ge, Sn, Pb, B, Al, Ga, As, Sb and Bi, and X is one or more elements selected from the group consisting of F, Cl, Br and I. a to c satisfy the above formulas (1) to (3). z is 0≤z≤0.3.

If the molar ratio of F and Cl relative to the entire X is largest in the formula (4), a is preferably 5.1≤a≤6.6, with 5.2≤a≤6.4 being more preferable. If the molar ratio of Br is largest, a is preferably 5.2≤a≤6.8, with 5.3≤a≤6.6 being more preferable. If the molar ratio of I is largest, a is preferably 5.3≤a≤7.0, with 5.4≤a≤6.8 being more preferable.

In X in the formula (4), if two or more halogen elements are contained, the amount ratio of each element is not limited.

z is more preferably 0.

It is preferred that the sulfide solid electrolyte of this embodiment do not have a diffraction peak (not a diffraction peak derived from an argyrodite type crystal structure) at 2θ=17.6±0.4 deg and 2θ=18.1±0.4 deg in powder X-ray diffractometry using CuKα rays. If it has the diffraction peak at these positions, it is preferred that the sulfide solid electrolyte satisfy the following formula (5):

$$0 < I_A/I_B < 0.05 \tag{5}$$

(wherein in the formula, $I_A$ represents the intensity of the diffraction peak which is not a diffraction peak derived from the argyrodite type crystal structure among diffraction peaks at $2\theta=17.6\pm0.4$ deg and $2\theta=18.1\pm0.4$ deg, and $I_B$ represents the intensity of the diffraction peak at $2\theta=29.7\pm0.5$ deg).

The crystal structure specified by $I_A$ (hereinafter referred to as the $Li_3PS_4$ crystal structure) has a low ionic conductivity, and hence lowers ionic conductivity of the solid electrolyte. The above formula (5) shows that the amount of the $Li_3PS_4$ crystal structure is relatively low as compared with the amount of the argyrodite type crystal structure. The formula (5) is more preferably $0 < I_A/I_B < 0.03$, with $0 < I_A/I_B < 0.02$ being further preferable.

There may be case where either $2\theta=17.6\pm0.4$ deg or $2\theta=18.1\pm0.4$ deg cannot be measured since it overlaps the diffraction peak of the argyrodite type crystal structure that has a relatively strong peak intensity. Therefore, "the diffraction peak which is not a diffraction peak derived from the argyrodite type crystal structure among diffraction peaks at $2\theta=17.6\pm0.4$ deg and $2\theta=18.1\pm0.4$ deg" usually means one having a weaker intensity among these two peaks measured. In the meantime, there is a case where noises are observed like a peak. In such a case, it is needless to say that if this noise is assumed to be $I_B$, the formula (5) is satisfied.

The sulfide solid electrolyte of this embodiment can be produced by a production method comprising a step in which a mixture of raw materials mentioned later is reacted by applying a mechanical stress to prepare an intermediate and a step in which the intermediate is heat-treated for crystallization.

As the raw materials used, two or more compounds or simple substances containing, as a whole, elements to be contained as essential components in a sulfide solid electrolyte to be produced (i.e. lithium, phosphorus, sulfur, and halogen element (X) are used in combination).

Examples of the raw material containing lithium include lithium compounds such as lithium sulfide ($Li_2S$), lithium oxide ($Li_2O$), lithium carbonate ($Li_2CO_3$), elemental lithium metal, and the like. Among them, a lithium compound is preferable, with lithium sulfide being more preferable.

Examples of the raw material containing phosphorus include phosphorus compounds such as phosphorus sulfide such as phosphorus trisulfide ($P_2S_3$) and phosphorus pentasulfide ($P_2S_5$), sodium phosphate ($Na_3PO_4$), elemental phosphorus, or the like. Among these, phosphorus sulfide is preferable, with phosphorus pentasulfide ($P_2S_5$) being more preferable.

As the raw material containing the halogen element X, it is preferred that the raw material contain a halogen compound represented by the following formula (6), for example.

$$M_l\text{-}X_m \tag{6}$$

In the formula (6), M is sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi) or those in which an oxygen element or a sulfur element are bonded to these elements, and lithium (Li) or phosphorus (P) is preferable, with lithium (Li) being more preferable.

X is a halogen element selected from the group consisting of fluorine (F), chlorine (Cl), bromine (Br) and iodine (I).

l is an integer of 1 or 2 and m is an integer of 1 to 10. When m is an integer of 2 to 10, that is, when plural Xs are present, the Xs may be the same or different. For example, in the case of $SiBrCl_3$ mentioned later, m is 4, and X is formed of different elements, i.e. Br and Cl.

As the halogen compound represented by the formula (6), specifically, sodium halide such as NaI, NaF, NaCl and NaBr lithium halide such as LiF, LiCl, LiBr and LiI; boron halide such as $BCl_3$, $BBr_3$ and $BI_3$; aluminum halide such as $AlF_3$, $AlBr_3$, $AlI_3$ and $AlCl_3$; silicon halide such as $SiF_4$, $SiCl_4$, $SiCl_3$, $Si_2Cl_6$, $SiBr_4$, $SiBrCl_3$, $SiBr_2Cl_2$ and $SiI_4$; phosphorus halide such as $PF_3$, $PF_5$, $PCl_3$, $PCl_5$, $POCl_3$, $PBr_3$, $POBr_3$, $PI_3$, $P_2Cl_4$ and $P_2I_4$; sulfur halide such as $SF_2$, $SF_4$, $SF_6$, $S_2F_{10}$, $SCl_2$, $S_2Cl_2$ and $S_2Br_2$; germanium halide such as $GeF_4$, $GeCl_4$, $GeBr_4$, $GeI_4$, $GeF_2$, $GeCl_2$, $GeBr_2$ and $GeI_2$; arsenic halide such as $AsF_3$, $AsCl_3$, $AsBr_3$, $AsI_3$ and $AsF_5$; selenium halide such as $SeF_4$, $SeF_6$, $SeCl_2$, $SeCl_4$, $Se_2Br_2$ and $SeBr_4$; tin halide such as $SnF_4$, $SnCl_4$, $SnBr_4$, $SnI_4$, $SnF_2$, $SnCl_2$, $SnBr_2$ and $SnI_2$; antimony halide such as $SbF_3$, $SbCl_3$, $SbBr_3$, $SbI_3$, $SbF_5$ and $SbCl_5$; tellurium halide such as $TeF_4$, $Te_2F_{10}$, $TeF_6$, $TeCl_2$, $TeCl_4$, $TeBr_2$, $TeBr_4$ and $TeI_4$; lead halide such as $PbF_4$, $PbCl_4$, $PbF_2$, $PbCl_2$, $PbBr_2$ and $PbI_2$; bismuth halide such as $BiF_3$, $BiCl_3$, $BiBr_3$ and $BiI_3$, and the like can be given.

Among these, lithium halides such as lithium chloride (LiCl), lithium bromide (LiBr) and lithium iodide (LiI), and phosphorous halide such as phosphorus pentachloride ($PCl_5$), phosphorus trichloride ($PCl_3$), phosphorus pentabromide ($PBr_5$), phosphorus tribromide ($PBr_3$) or the like can preferably be given. Among these, lithium halides such as LiCl, LiBr and LiI and $PBr_3$ are preferable, with lithium halide such as LiCl, LiBr and LiI are more preferable, with LiCl and LiBr being further preferable.

As the halogen compound, one of the above-mentioned compounds may be used singly, or two or more may be used in combination. That is, at least one of the above-mentioned compounds can be used. Further, in this case, as for the halogen element, one selected from the above-mentioned halogen elements can be used singly or two or more selected from the above-mentioned halogen elements can be used in combination.

In this embodiment, it is preferred that the raw materials contain a lithium compound, a phosphorus compound and a halogen compound, and at least one of the lithium compound and the phosphorus compound comprises a sulfur element. Combination of lithium sulfide, phosphorus sulfide and lithium halide is more preferable, with combination of lithium sulfide, phosphorus pentasulfide and lithium halide being further preferable.

In this embodiment, the elemental ratio of sulfur contained in the sulfide solid electrolyte is high. As a result, a sulfide solid electrolyte having a high ionic conductivity can be obtained. Further, since the elemental ratio of sulfur contained in the sulfide solid electrolyte is high, it is possible to obtain a sulfide solid electrolyte that is hardly agglomerated at the time of sintering even if the elemental ratio of a halogen element is high.

In order to adjust the elemental composition of the sulfide solid electrolyte, for example, when lithium sulfide, phosphorus sulfide and lithium halide (LiX) are used as the raw material, a method can be given in which an elemental sulfur, a sulfur compound such as an organic polysulfide, an inorganic polysulfide, sulfur nitride, etc. are further used as raw materials, by which the elemental ratio of a sulfur element is increased. By using these, from the stoichiometric ratio calculated from the three types of the raw materials, i.e. $Li_2S$, $P_2S_5$ and LiX, it is preferable to increase the amount of sulfur relatively. Especially, it is preferable to use the elemental sulfur as the raw material.

In this embodiment, a mechanical stress is applied to the above-mentioned raw materials to allow them to react, thereby allowing them to be an intermediate. Here, the "applying a mechanical stress" means that shear force, impact strength, etc. are mechanically applied. As means for applying a mechanical stress, a pulverizer such as a planetary ball mill, a vibration mill and a rolling mill, and a kneader, etc. can be given.

In the conventional technology (for example, Patent Document 2, etc.), pulverization and mixing are carried out to such an extent that the crystallinity of the raw material powder can be maintained. On the other hand, in this embodiment, it is preferable that the raw materials be subjected to a mechanical stress and reacted, thereby to obtain an intermediate containing a glass component That is, by a mechanical stress higher than that used in the conventional technology, pulverization and mixing are conducted to such a level that at least part of the raw material powder cannot maintain crystallinity. As a result, in the stage of an intermediate, a $PS_4$ unit structure that is a basic framework structure of the argyrodite type crystal structure can be generated and a halogen can be highly dispersed. As a result, in the heat-treatment as the next step, when the argyrodite type crystal structure that is a stable phase is formed, a halogen tends to be incorporated into the argyrodite type crystal structure easily. Further, it is assumed that a low ionic conductivity phase such as $Li_3PS_4$ crystal structure is hardly generated since a halogen is not passed through the different crystal phases of the region. As a result, the sulfide solid electrolyte of this embodiment exhibits high ionic conductivity.

Presence of a glass (amorphous) component in an intermediate can be confirmed by the presence of a broad peak (hallo pattern) derived from an amorphous component in an XRD measurement.

Further, in the case of the sulfide solid electrolyte of this embodiment, since there is no need to heat the raw material at 550° C. for 6 days as in the case of the Patent Document 1, productivity is high.

The sulfide solid electrolyte having a high ionic conductivity is a sulfide solid electrolyte in which a large amount of a halogen is incorporated into an argyrodite type crystal structure. In order to obtain a sulfide solid electrolyte having a high ionic conductivity, it is preferred that the amount of lithium halide (LiX) as the raw material be high. On the other hand, if the amount of LiX is increased, the amount of $Li_2S$ is relatively decreased, and the amount ratio of S in the raw material is decreased. As a result, a $P_2S_7$ unit structure and a $P_2S_6$ unit structure tend to be generated easily in an intermediate during the production of a glass intermediate. As a result, when an argyrodite type crystal structure is formed by heat treating a glass intermediate, a halogen is passed through the above-mentioned structure formed in the intermediate, and a halogen is incorporated into other phases before entering the site of an argyrodite type crystal structure, or agglomerated or re-agglomerated without being dispersed, by which a high ionic conductivity cannot be obtained. In this embodiment, the above-mentioned problems can be suppressed by producing a glass-like intermediate by using an excessive amount of S.

When a sulfide solid electrolyte containing an argyrodite type crystal structure is produced directly from a raw material without passing through an intermediate containing glass components, it is difficult to obtain a sulfide solid electrolyte having a high ionic conductivity. The reason therefor is as follows. Since a halogen ion tends to be accumulated in a stable phase, when a sulfide solid electrolyte is produced directly from a raw material, during a period in which an argyrodite type crystal structure is formed in a sulfide solid electrolyte, a halogen ion is incorporated into other stable phases or agglomeration or re-agglomeration tends to occur without dispersion of a halogen ion.

By producing an intermediate containing glass components and mixing raw material components at an atomic level, a halogen can be entered smoothly the site of an argyrodite type crystal structure during a heat treatment of an intermediate containing glass components.

As the condition of pulverization and mixing, for example, when a planetary ball mill is used as a pulverizer, the rotation speed may be from several tens to several hundreds of revolution/minute and may be treated for 0.5 hour to 100 hours. More specifically, in the case of the planetary ball mill (Model No. P-7, manufactured by Fritsch Co.) used in this embodiment, the rotation speed of the planetary ball mill is preferably 350 rpm or more and 400 rpm or less, more preferably 360 rpm or more and 380 rpm or less.

For example, when a ball made of zirconia is used as the pulverization media, its diameter is preferably 0.2 to 20 mm.

The intermediate prepared by pulverization and mixing is heat-treated in an inert gas atmosphere such as nitrogen, argon and the like. The heat treatment temperature is preferably 350 to 650° C., particularly preferably 400 to 550° C.

In this embodiment, the raw material mixture may be heat treated in an atmosphere of hydrogen sulfide. As a result, since evaporation of sulfur at the time of a heat treatment is suppressed, the content of sulfur can be maintained high. In this embodiment, heat treatment may be conducted in the absence of hydrogen sulfide.

For example, when lithium sulfide, phosphorus pentasulfide, lithium halide, and an elemental sulfur is used as a raw material of the sulfide solid electrolyte of the this embodiment, the molar ratio of the charged raw material is preferably lithium sulfide:phosphorus pentasulfide:lithium halide:elemental sulfur=45 to 70:8 to 15:20 to 40:more than 0 to 20 or less. After a mechanical stress is applied to these raw materials to allow them to react to obtain an intermediate, by conducting a heat treatment as mentioned above, it is possible to obtain the sulfide solid electrolyte satisfying the above formulas (1) to (3).

The sulfide solid electrolyte of this embodiment can be used in a solid electrolyte layer, a positive electrode, a negative electrolyte, etc. of a lithium ion battery, etc.

For example, by adding an active material (positive electrode active material or negative electrode active material) to the sulfide solid electrolyte of this embodiment to obtain an electrode mix, and the resulting electrode mix is used as a raw material of the positive electrode layer and the negative electrode layer. Further, the sulfide solid electrolyte of this embodiment can be used as a material of an electrolyte layer. These positive electrode layer, the negative electrode layer and the electrolyte layer can be used as each element of a lithium ion battery.

EXAMPLES

Hereinbelow, the invention will be explained in more detail in accordance with the Examples.

The evaluation methods are as follows:

(1) Measurement of Ionic Conductivity and Electron Conductivity

The sulfide solid electrolyte prepared in each example was filled in a tablet molding machine and a pressure of 407 MPa (press indication value 22 MPa) was applied by using a press machine to obtain a molded body. As the electrode, a carbon was put on the both sides of the molded body, and a pressure was applied again by a tablet molding machine, by which a molded body for measurement (diameter about 10 mm, thickness: 0.1 to 0.2 cm) was prepared. For this molded body, an ionic conductivity was measured by AC impedance measurement. The numerical value at 25° C. was adopted as the conductivity value.

In the ionic conductivity measuring method used in this example, when the ionic conductivity is less than $1.0 \times 10^{-6}$ S/cm, the ionic conductivity was determined to be unmeasurable.

Further, the electronic conductivity of this molded body was measured by direct current electric measurement. As for the value of the electronic conductivity, a numerical value at 25° C. was adopted. When the electronic conductivity when a voltage of 5 V was applied was less than $1.0 \times 10^{-6}$ S/cm, the electron conductivity was determined to be unmeasurable.

(2) Measurement of X-Ray Diffraction (XRD) Measurement

A circular pellet having a diameter of 10 mm and a height of 0.1 to 0.3 cm was molded from the powder of the sulfide solid electrolyte produced in each example to prepare a sample. This sample was measured without touching the air using an air-tight holder for XRD. The 2θ position of the diffraction peak was determined by the centroid method using an XRD analysis software JADE.

Measurement was conducted under the following conditions using a powder X-ray diffractometer SmartLab manufactured by Rigaku Corporation.

Tube voltage: 45 kV
Tube current: 200 mA
X-ray wavelength: CuKα rays (1.5418 Å)
Optical system: Parallel beam system
Slit configuration: Solar slit 5°, incident slit: 1 mm, light receiving slit 1 mm
Detector. Scintillation counter
Measurement range: 2θ=10-60 deg
Step width, scan speed: 0.02 deg, 1 deg/min In the analysis of the peak position for confirming the existence of the crystal structure from the measurement result, the peak position was obtained by drawing the baseline by cubic approximation using the XRD analysis program JADE.

In the peak intensity, one peak intensity of the argyrodite type crystal structure existing at 2θ=29.7 deg±0.5 deg and two peak intensities of the $Li_3PS_4$ crystal structure existing at 2θ=17.6±0.4 deg and 18.1±0.4 deg were analyzed by the following procedure, and the intensity ratio was calculated.

Smoothing was carried out by moving average of 5 points of measurement data, and the lowest intensity point between 17.5 to 18.5 deg was taken as the background and subtracted from the measured data. Thereafter, the maximum value of the actually measured data between the maximum values of the actually measured data at 17.0 to 17.8 deg and 17.9 to 18.5 deg was calculated, and the smaller peak intensity was used as the peak intensity of the $Li_3PS_4$ crystal structure. In addition, the maximum value of the actually measured data at 29.0 to 32.0 deg was calculated as the peak intensity of the argyrodite type crystal structure.

(3) ICP Measurement

Powders of the sulfide solid electrolyte prepared in each example were weighed and collected in a vial bottle in an argon atmosphere. A KOH alkaline aqueous solution was placed in the vial bottle, and the sample was dissolved while paying attention to the collection of the sulfur content, and the resultant was appropriately diluted to prepare a measurement solution. This solution was measured by means of a Paschen Runge type ICP-OES apparatus (SPECTRO ARCOS manufactured by SPECTRO Japan), and the composition was determined.

For the calibration solution, Li, P, and S were prepared by using a 1000 mg/L standard solution for ICP measurement, Cl and Br were prepared by using a 1000 mg/L standard solution for ion chromatography, and I was prepared by using potassium iodide (special grade reagent).

The two measurement solutions were prepared for each sample, and five measurements were conducted for each measurement solution, and the average value was calculated. The composition was determined by the average of the measured values of the two measurement solutions.

Production Example 1

(Production of Lithium Sulfide ($Li_2S$))

200 g of LiOH anhydride (manufactured by Honjo Chemical Co., Ltd.), which had been dried under an inert gas, was charged in a 500-mL separable flask equipped with a stirrer, the temperature was raised under nitrogen flow, and the internal temperature was maintained at 200° C. The gas was switched to hydrogen sulfide gas (Sumitomo Seika Chemical Co., Ltd.), and the flow rate was set to 500 mL/min, and LiOH anhydride and hydrogen sulfide were reacted.

The water produced by the reaction was condensed and recovered by a condenser. 144 mL of water was recovered after 6 hours of reaction, and the reaction was continued for 3 hours, but water generation was not observed.

The resulting powder was recovered and the purity and XRD were measured, and as a result, the purity was found to be 98.5%, and the peak pattern of $Li_2S$ was confirmed by XRD.

Example 1

Lithium sulfide (purity: 98.5%), phosphorus pentasulfide (manufactured by Thermophos International, purity: 99.9% or more), lithium chloride (manufactured by Sigma Aldrich Co.; purity: 99%) and an elemental sulfur (manufactured by Sigma Aldrich Co.; purity: 99.9%) were used as starting materials (hereinafter, the purity of each starting material was the same). The raw materials were mixed such that the molar ratio of lithium sulfide ($Li_2S$), phosphorus pentasulfide ($P_2S_5$), lithium chloride (LiCl) and elemental sulfur (S) ($Li_2S:P_2S_5:LiCl:S$) became 42.2:11.1:35.6:11.1. Specifically, 0.464 g of lithium sulfide, 0.591 g of phosphorus pentasulfide, 0.360 g of lithium chloride and 0.085 g of an elemental sulfur were mixed to obtain a raw material mixture.

The raw material mixture and 30 g of zirconia balls having a diameter of 10 mm were placed in a zirconia pot (45 mL) of a planetary ball mill (manufactured by Fritsch Co. Ltd., model No. P-7) and completely sealed in a glove box in an atmosphere of argon. The inside of the pot was allowed to be an argon atmosphere. The mixture was treated (mechanical milling) for 25 hours at 370 rpm by means of a planetary ball mill, and powder (intermediate) was obtained. For the resulting intermediate, the results obtained by evaluation by XRD are shown in FIG. 1. From the resulting XRD pattern, it could be confirmed that major part of the resulting intermediate was glass.

Approximately 1.5 g of the above-mentioned intermediate powder was packed in a Tammann tube (PT2, manufactured by Tokyo Glass Instruments Co., Ltd.) in a grove box under an argon atmosphere, and the mouth of the Tammann tube was closed with a quartz wool, and the container was further sealed with a SUS sealed container so that no air could enter. Thereafter, the sealed container was placed in an electric furnace (FUW243PA, manufactured by AdvanTech) and heat-treated at a rate of 2.5° C./min from room temperature to 520° C. (increased to 520° C. in 3 hours), maintained at 520° C. for 8 hours, followed by slow cooling to obtain a sulfide solid electrolyte.

Figure 2:
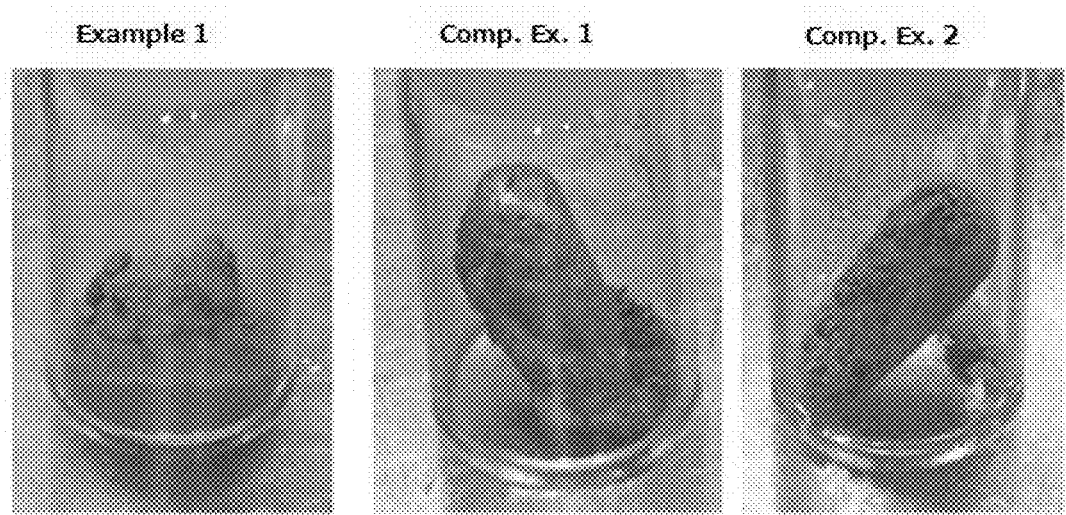
FIG. 2 is a photograph of an external appearance of a sulfide solid electrolyte immediately after the collection.

The photograph of the appearance of the sulfide solid electrolyte immediately after the recovery is shown in FIG. 2. It can be confirmed that most of the sulfide solid electrolyte is powdery. Part of an agglomerated body was easily pulverized by pulverization by a mortar.

The ionic conductivity ($\sigma$) of the sulfide solid electrolyte was 8.9 mS/cm, and the electron conductivity was less than $10^{-6}$ S/cm.

Figure 3:
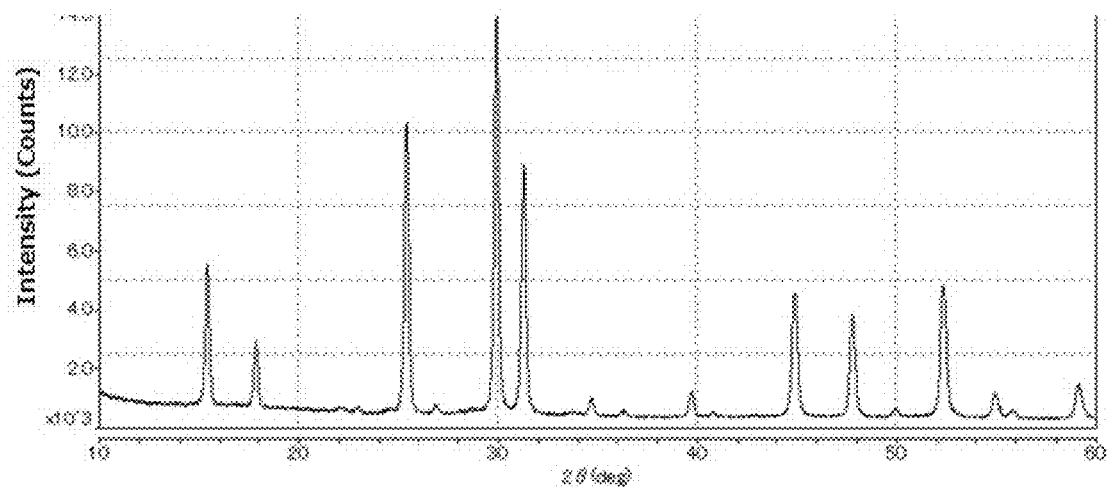
FIG. 3 is an X-ray diffraction pattern of a sulfide solid electrolyte obtained in Example 1.

The XRD pattern of the sulfide solid electrolyte is shown in FIG. 3. A peak derived from the argyrodite type crystal structure was observed at 2θ=15.6, 18.0, 25.6, 30.1, 31.5, 45.2 and 48.1 deg. On the other hand, a peak at 17.6±0.4 deg derived from the $Li_3PS_4$ crystal structure was not observed.

The sulfide solid electrolyte was subjected to an ICP analysis, and the molar ratio of each element was measured. The ionic conductivity and the residual ratio were measured. The results are shown in Table 1.

TABLE 1

| | Molar ratio of each element to phosphorus | | | | | Ionic conductivity |
|---|---|---|---|---|---|---|
| | a (Li/P) | b (S/P) | c (Cl/P) | a − b | a + c | ($\sigma$) (mS/cm) |
| Ex. 1 | 5.40 | 4.45 | 1.70 | 0.95 | 7.10 | 8.9 |
| Ex. 2 | 5.33 | 4.36 | 1.68 | 0.97 | 7.01 | 6.6 |
| Ex. 3 | 5.42 | 4.44 | 1.62 | 0.98 | 7.04 | 8.2 |
| Ex. 4 | 5.34 | 4.40 | 1.67 | 0.94 | 7.01 | 9.2 |
| Ex. 5 | 6.04 | 5.32 | 1.25 | 0.72 | 7.29 | 5.1 |
| Ex. 6 | 5.56 | 4.71 | 1.45 | 0.85 | 7.01 | 5.8 |
| Ex. 7 | 5.58 | 4.59 | 1.62 | 0.99 | 7.20 | 6.0 |
| Ex. 8 | 5.82 | 4.98 | 1.39 | 0.84 | 7.21 | 5.3 |
| Ex. 9 | 5.47 | 4.57 | 1.68 | 0.90 | 7.15 | 6.2 |
| Ex. 10 | 5.50 | 4.60 | 1.60 | 0.90 | 7.10 | 6.5 |

TABLE 1-continued

| | Molar ratio of each element to phosphorus | | | | | Ionic conductivity |
|---|---|---|---|---|---|---|
| | a (Li/P) | b (S/P) | c (Cl/P) | a − b | a + c | ($\sigma$) (mS/cm) |
| Ex. 11 | 5.60 | 4.80 | 1.42 | 0.80 | 7.02 | 5.5 |
| Ex. 12 | 5.70 | 4.73 | 1.53 | 0.97 | 7.23 | 5.5 |
| Comp. Ex. 1 | 5.30 | 4.30 | 1.68 | 1.00 | 6.98 | 0.8 |
| Comp. Ex. 2 | 6.01 | 4.89 | 1.07 | 1.12 | 7.08 | 0.6 |
| Comp. Ex. 3 | 5.77 | 4.76 | 1.22 | 1.01 | 6.99 | 3.2 |
| Comp. Ex. 4 | 6.76 | 6.08 | 0.55 | 0.68 | 7.31 | 1.2 |
| Comp. Ex. 5 | 5.80 | 5.15 | 1.17 | 0.65 | 6.97 | 1.6 |
| Comp. Ex. 6 | 5.85 | 4.82 | 1.47 | 1.03 | 7.32 | 2.4 |

Examples 2 to 12 and Comparative Examples 1 to 6

A sulfide solid electrolyte was prepared and evaluated in the same manner as in Example 1, except the composition of the raw materials, the conditions of mechanical milling and the heat treatment conditions of intermediate were changed as shown in Table 2. The results are shown in Table 1.

Each sulfide solid electrolyte had an electron conductivity of less than $10^{-6}$ S/cm.

In Examples 2 to 7 and 9 to 11, the intermediates were produced in the same manner as in Example 1, except that hydrogen sulfide was introduced at the time of heat treatment of an intermediate.

For example, in Example 2, in a glove box in an atmosphere of argon, about 1.5 g of powder of the intermediate was filled in a glass tube provided with sealing function. In order to prevent entering of the air, the front end of the glass tube was sealed with a dedicated jig. Thereafter, the glass tube was set in an electric furnace. The dedicated jig was inserted into a joint in the electric furnace, connected with a gas circulation tube, and subjected to a heat treatment while circulating hydrogen sulfide at a flow rate of 20 mL/min. Specifically, the temperature was elevated from room temperature to 500° C. at a rate of 2.5° C./min (heated to 500° C. for 3 hours), and retained at 500° C. for 4 hours. Thereafter, the glass tube was gradually cooled, by which a sulfide solid electrolyte was obtained.

In Comparative Example 1, a peak derived from the argyrodite type crystal structure was observed at 2θ=15.5, 17.7, 25.5, 30.0, 31.4, 44.8 and 48.0 deg. On the other hand, a peak derived from the $Li_3PS_4$ crystal structure was not observed.

For Comparative Examples 1 and 2, the photograph of the appearance of the sulfide solid electrolyte immediately after the recovery is shown in FIG. 2. It can be confirmed that the sulfide solid electrolyte was in the form of a large agglomerate. By pulverization by a mortar, large grains remained, i.e. sufficient pulverization could not be conducted.

TABLE 2

| | Amount of raw materials (g) | | | | Mechanical milling conditions | | Heat treatment conditions | | Presence or absence of $H_2S$ |
|---|---|---|---|---|---|---|---|---|---|
| | $Li_2S$ | $P_2S_5$ | LiCl | S | Number of revolutions (rpm) | Treatment time (h) | Treatment temperature (° C.) | Treatment time (h) | (mL/min) |
| Ex. 1 | 0.464 | 0.591 | 0.360 | 0.085 | 370 | 25 | 520 | 8 | — |
| Ex. 2 | 0.464 | 0.591 | 0.360 | 0.085 | 370 | 60 | 500 | 4 | 20 |
| Ex. 3 | 0.464 | 0.591 | 0.360 | 0.085 | 370 | 60 | 430 | 4 | 20 |
| Ex. 4 | 0.439 | 0.559 | 0.341 | 0.161 | 370 | 60 | 500 | 4 | 20 |

TABLE 2-continued

| | Amount of raw materials (g) | | | | Mechanical milling conditions | | Heat treatment conditions | | Presence or absence of $H_2S$ |
|---|---|---|---|---|---|---|---|---|---|
| | | | | | Number of revolutions | Treatment time | Treatment temperature | Treatment time | |
| | $Li_2S$ | $P_2S_5$ | LiCl | S | (rpm) | (h) | (° C.) | (h) | (mL/min) |
| Ex. 5 | 0.608 | 0.612 | 0.280 | 0 | 370 | 25 | 500 | 4 | 30 |
| Ex. 6 | 0.484 | 0.557 | 0.298 | 0.161 | 370 | 25 | 500 | 4 | 20 |
| Ex. 7 | 0.480 | 0.581 | 0.355 | 0.084 | 370 | 25 | 520 | 4 | 20 |
| Ex. 8 | 0.527 | 0.580 | 0.310 | 0.084 | 370 | 25 | 500 | 4 | — |
| Ex. 9 | 0.472 | 0.586 | 0.358 | 0.085 | 370 | 25 | 520 | 4 | 20 |
| Ex. 10 | 0.500 | 0.621 | 0.379 | 0 | 370 | 60 | 430 | 4 | 20 |
| Ex. 11 | 0.511 | 0.589 | 0.315 | 0.085 | 370 | 25 | 500 | 4 | 20 |
| Ex. 12 | 0.461 | 0.658 | 0.319 | 0.161 | 370 | 25 | 500 | 4 | — |
| Comp. Ex. 1 | 0.492 | 0.626 | 0.382 | 0 | 370 | 25 | 520 | 8 | — |
| Comp. Ex. 2 | 0.642 | 0.621 | 0.237 | 0 | 370 | 25 | 520 | 8 | — |
| Comp. Ex. 3 | 0.559 | 0.588 | 0.269 | 0.085 | 370 | 25 | 500 | 4 | — |
| Comp. Ex. 4 | 0.747 | 0.564 | 0.108 | 0.081 | 370 | 25 | 500 | 4 | 50 |
| Comp. Ex. 5 | 0.559 | 0.588 | 0.269 | 0.085 | 370 | 25 | 500 | 4 | 50 |
| Comp. Ex. 6 | 0.452 | 0.520 | 0.318 | 0.210 | 370 | 25 | 500 | 4 | — |

Comparative Example 7

The raw materials were mixed such that the molar ratio of lithium sulfide ($Li_2S$), phosphorus pentasulfide ($P_2S_5$) and lithium chloride (LiCl) ($Li_2S:P_2S_5:LiCl$), which was used in Example 1, became 1.9:0.5:1.6.

The raw material mixture and 30 g of zirconia balls having a diameter of 10 mm were placed in a zirconia pot (45 mL) of a planetary ball mill (manufactured by Fritsch Co., Ltd., model No. P-7) and completely sealed, and the inside of the pot was allowed to be an argon atmosphere. Mixing was conducted to such an extent that the crystallinity of the raw material powder can be maintained, thereby to obtain a mixed powder.

Figure 4:
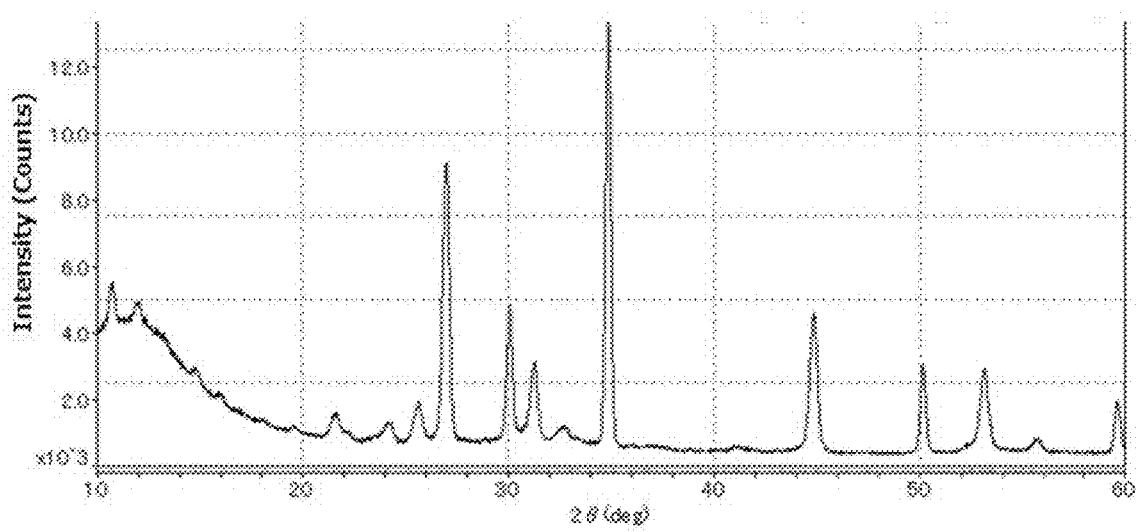
FIG. 4 is an X-ray diffraction pattern of mixed powder in Comparative Example 7.

The XRD pattern of the resulting mixed powder is shown in FIG. 4. In the resulting XRD pattern, the peaks of $Li_2S$, $P_2S_5$ and LiCl as the raw materials were confirmed, and the crystallinity of the raw material powder was maintained.

In a glove box in an atmosphere of argon, about 1.5 g of powder of the intermediate was filed in a glass tube provided with sealing function. In order to prevent entering of air, the front end of the glass tube was sealed with a dedicated jig. Thereafter, the glass tube was set in an electric furnace. The dedicated jig was inserted into a joint in the electric furnace, connected with a gas circulation tube, and subjected to a heat treatment while circulating hydrogen sulfide at a flow rate of 20 m/min. Specifically, the temperature was elevated from room temperature to 500° C. at a rate of 2.5° C./min (heated to 500° C. for 3 hours), and retained at 500° C. for 4 hours. Thereafter, the glass tube was gradually cooled, by which a sulfide solid electrolyte was obtained.

For Examples 3 to 7 and 9 to 11, hydrogen sulfide was introduced in the same manner as in Example 2 under the conditions of Table 2.

The resulting sulfide solid electrolyte was subjected to an ICP analysis, and the molar ratio of each element was measured. The ionic conductivity was also measured. As a result, a (Li/P)=5.4, b (S/P)=4.4, c (Cl/P)=1.6, and the ionic conductivity (σ) was 2.7 mS/cm.

Example 13

In addition to lithium sulfide ($Li_2S$), phosphorus pentasulfide ($P_2S_5$) and lithium chloride (LiCl) and an elemental sulfur, lithium iodide (LiI: manufactured by Sigma Aldrich Co. Ltd., purity: 99%) was further used as the raw materials. The raw materials were mixed such that the molar ratio thereof ($Li_2S:P_2S_5:LiCl:LiI:S$) became 42.2:11.1:33.3:2.2:11.1. Specifically, 0.449 g of lithium sulfide, 0.572 g of phosphorus pentasulfide, 0.327 g of lithium chloride, 0.069 g of lithium iodide and 0.083 g of elemental sulfur were mixed to obtain a raw material mixture.

By using the resulting raw material mixture, a sulfide solid electrolyte was produced under the same mechanical milling conditions and heat treatment conditions as Example 2. The ionic conductivity (σ) of the resulting sulfide solid electrolyte was 5.3 mS/cm. The electron conductivity was less than $10^{-6}$ S/cm.

For the resulting sulfide solid electrolyte, as a result of XRD, a peak derived from the argyrodite type crystal structure was observed.

As a result of an ICP analysis, the molar ratio "a (Li/P)" was 5.47, the molar ratio "b (S/P)" was 4.59 and the molar ratio "c ((Cl+I)/P)" was 1.67.

The invention claimed is:

1. A sulfide solid electrolyte, comprising:
an argyrodite type crystal structure comprising lithium, phosphorus, sulfur and at least one halogen element such that the at least one halogen element includes chlorine,
wherein the argyrodite type crystal structure has a composition satisfying 5.33≤a≤6.04, 0.70≤a−b<1.0 and 7.0<a+c≤7.3 where a represents a molar ratio of lithium to phosphorus, b represents a molar ratio of sulfur to phosphorus, c represents a molar ratio of halogen to phosphorus, b>0, and c>0.

2. The sulfide solid electrolyte according to claim 1, wherein the composition of the argyrodite type crystal structure satisfies formula, $Li_a(P_{1-z}M_z)S_bX_c$, where M is one or more elements selected from the group consisting of Si, Ge, Sn, Pb, B, Al, Ga, As, Sb and Bi, X is the at least one halogen element including chlorine, and z satisfies 0≤z≤0.3.

3. The sulfide solid electrolyte according to claim 1, wherein the argyrodite type crystal structure has a powder X-ray diffraction pattern obtained using CuKα radiation comprising a diffraction peak at 2θ=25.2±0.5 deg and a diffraction peak at 2θ=29.7±0.5 deg.

4. An electrode mix, comprising:
the sulfide solid electrolyte according to claim 1; and
an active material.

5. A lithium ion battery, comprising at least one of:
the sulfide solid electrolyte according to claim 1; and
an electrode mix comprising the sulfide solid electrolyte and an active material.

6. The sulfide solid electrolyte according to claim 1, wherein the composition of the argyrodite type crystal structure satisfies $0.85 \leq a-b < 1.0$.

7. The sulfide solid electrolyte according to claim 1, wherein the composition of the argyrodite type crystal structure satisfies $7.0 < a+c \leq 7.15$.

8. The sulfide solid electrolyte according to claim 1, wherein the composition of the argyrodite type crystal structure satisfies $0.85 \leq a-b < 1.0$ and $7.0 < a+c \leq 7.15$.

9. The sulfide solid electrolyte according to claim 1, wherein the composition of the argyrodite type crystal structure satisfies $0.9 \leq a-b < 1.0$ and $7.0 < a+c \leq 7.1$.

10. The sulfide solid electrolyte according to claim 1, wherein the at least one halogen element in the composition of the argyrodite type crystal structure includes at least one other halogen element selected from the group consisting of fluorine, bromine and iodine such that a molar amount of chlorine is greater than a molar amount of the at least one other halogen element.

11. The sulfide solid electrolyte according to claim 8, wherein the at least one halogen element in the composition of the argyrodite type crystal structure includes at least one other halogen element selected from the group consisting of fluorine, bromine and iodine such that a molar amount of chlorine is greater than a molar amount of the at least one other halogen element.

12. The sulfide solid electrolyte according to claim 2, wherein the composition of the argyrodite type crystal structure satisfies $0.85 \leq a-b < 1.0$ and $7.0 < a+c \leq 7.15$.

13. The sulfide solid electrolyte according to claim 12, wherein the at least one halogen element in the composition of the argyrodite type crystal structure includes at least one other halogen element selected from the group consisting of fluorine, bromine and iodine such that a molar amount of chlorine is greater than a molar amount of the at least one other halogen element.

14. The sulfide solid electrolyte according to claim 3, wherein the composition of the argyrodite type crystal structure satisfies $0.85 \leq a-b < 1.0$ and $7.0 < a+c \leq 7.15$.

15. The sulfide solid electrolyte according to claim 14, wherein the at least one halogen element in the composition of the argyrodite type crystal structure includes at least one other halogen element selected from the group consisting of fluorine, bromine and iodine such that a molar amount of chlorine is greater than a molar amount of the at least one other halogen element.

16. The sulfide solid electrolyte according to claim 14, wherein the composition of the argyrodite type crystal structure satisfies formula, $Li_a(P_{1-z}M_z)S_bX_c$, where M is one or more elements selected from the group consisting of Si, Ge, Sn, Pb, B, Al, Ga, As, Sb and Bi, X is the at least one halogen element including chlorine, and z satisfies $0 \leq z \leq 0.3$.

17. The sulfide solid electrolyte according to claim 16, wherein the at least one halogen element in the composition of the argyrodite type crystal structure includes at least one other halogen element selected from the group consisting of fluorine, bromine and iodine such that a molar amount of chlorine is greater than a molar amount of the at least one other halogen element.

18. The sulfide solid electrolyte according to claim 3, wherein the powder X-ray diffraction pattern of the argyrodite type crystal structure has a diffraction peak at $2\theta=17.6\pm0.4$ deg or $2\theta=18.1\pm0.4$ deg, or the sulfide solid electrolyte has a powder X-ray diffraction pattern including a diffraction peak at $2\theta=17.6\pm0.4$ deg or $2\theta=18.1\pm0.4$ deg not derived from the argyrodite type crystal structure and satisfying $0<I_A/I_B<0.05$ where IA represents an intensity of the diffraction peak at $2\theta=17.6\pm0.4$ deg or $2\theta=18.1\pm0.4$ deg not derived from the argyrodite type crystal structure, and IB represents an intensity of a diffraction peak at $2\theta=29.7\pm0.5$ deg.

19. The sulfide solid electrolyte according to claim 1, wherein the composition of the argyrodite type crystal structure satisfies formula, $Li_{7-x}PS_{6-x+\alpha}X_{x+\beta}$, where X is the at least one halogen element including chlorine, $0<\alpha\leq0.30$ and $0\leq\beta<0.3$.

20. The sulfide solid electrolyte according to claim 19, wherein the at least one halogen element in the composition of the argyrodite type crystal structure includes at least one other halogen element selected from the group consisting of fluorine, bromine and iodine.

* * * * *

UNITED STATES PATENT AND TRADEMARK OFFICE
CERTIFICATE OF CORRECTION

PATENT NO.          : 10,818,966 B2  
APPLICATION NO.     : 15/672462  
DATED               : October 27, 2020  
INVENTOR(S)         : Futoshi Utsuno et al.

Page 1 of 1

It is certified that error appears in the above-identified patent and that said Letters Patent is hereby corrected as shown below:

On the Title Page

Items (71) Applicant and (73) Assignee should read:  
--(71) Applicant: IDEMITSU KOSAN CO.,LTD., Chiyoda-ku (JP)  
(73) Assignee: IDEMITSU KOSAN CO.,LTD., Chiyoda-ku (JP)--

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*